United States Patent
Bartel et al.

(10) Patent No.: US 9,623,612 B2
(45) Date of Patent: Apr. 18, 2017

(54) METHOD FOR FABRICATING COMPOSITE FASTENERS

(71) Applicant: The Boeing Company, Chicago, IL (US)

(72) Inventors: Aaron William Bartel, Mountlake Terrace, WA (US); Nathan A. Muntz, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 679 days.

(21) Appl. No.: 13/773,042

(22) Filed: Feb. 21, 2013

(65) Prior Publication Data

US 2014/0232042 A1    Aug. 21, 2014

(51) Int. Cl.
| | |
|---|---|
| *B29D 1/00* | (2006.01) |
| *B29C 70/46* | (2006.01) |
| *B29C 70/12* | (2006.01) |
| *B29L 1/00* | (2006.01) |

(52) U.S. Cl.
CPC ............. *B29D 1/005* (2013.01); *B29C 70/12* (2013.01); *B29C 70/465* (2013.01); *B29L 2001/002* (2013.01); *B29L 2001/007* (2013.01)

(58) Field of Classification Search
CPC ....... B29D 1/005; B29C 70/12; B29C 70/465; B29L 2001/002; B29L 2001/007
USPC ......................................................... 264/319
See application file for complete search history.

(56) References Cited

U.S. PATENT DOCUMENTS

| | | |
|---|---|---|
| 2,949,054 A | 8/1960 | White |
| 3,646,610 A | 2/1972 | Jackson |
| 4,370,390 A | 1/1983 | Burk |
| 4,433,652 A | 2/1984 | Holtzberg et al. |
| 4,623,290 A | 11/1986 | Kikuzawa et al. |
| 4,717,302 A | 1/1988 | Adams et al. |
| 4,718,801 A | 1/1988 | Berecz |
| 4,824,314 A | 4/1989 | Stencel |
| 4,925,719 A | 5/1990 | Staneluis et al. |
| 4,975,014 A | 12/1990 | Rufin et al. |
| 4,983,451 A | 1/1991 | Sugino et al. |
| 4,987,175 A | 1/1991 | Bunnell, Sr. |
| 5,056,257 A | 10/1991 | Cook |
| 5,057,257 A | 10/1991 | Neitzke |
| 5,062,415 A | 11/1991 | Weatherby et al. |

(Continued)

FOREIGN PATENT DOCUMENTS

| | | |
|---|---|---|
| DE | 102009032990 A1 | 2/2010 |
| EP | 0254481 A1 | 1/1988 |

(Continued)

OTHER PUBLICATIONS

Office Action, dated Apr. 2, 2015, regarding U.S. Appl. No. 13/773,120, 32 pages.

(Continued)

*Primary Examiner* — Robert J Grun
(74) *Attorney, Agent, or Firm* — Yee & Associates, P.C.

(57) ABSTRACT

Composite fasteners have a high fraction of discontinuous, randomly oriented reinforcing fibers. A charge of thermoplastic fiber flakes are heated to melting temperature within a reservoir, flowed into multiple mold cavities and compression molded. The molded fasteners have high strength, exhibit quasi-isotropic properties and may be produced in high volume.

13 Claims, 6 Drawing Sheets

(56) References Cited

U.S. PATENT DOCUMENTS

| | | | |
|---|---|---|---|
| 5,090,857 | A | 2/1992 | Dunn |
| 5,151,322 | A | 9/1992 | Kimoto et al. |
| 5,292,215 | A | 3/1994 | Roberts, III |
| 5,569,008 | A | 10/1996 | Chapkovich |
| 6,106,752 | A | 8/2000 | Chang et al. |
| 6,521,152 | B1 | 2/2003 | Wood et al. |
| 6,924,021 | B1 | 8/2005 | Colegrove et al. |
| 7,198,739 | B2 | 4/2007 | LaForest et al. |
| 7,208,220 | B2 | 4/2007 | Yamasaki et al. |
| 7,462,879 | B2 | 12/2008 | Oohata et al. |
| 7,527,759 | B2 | 5/2009 | Lee et al. |
| 7,896,599 | B2 | 3/2011 | Stephen et al. |
| 8,101,262 | B2 | 1/2012 | Yamanouchi et al. |
| 8,329,280 | B2 | 12/2012 | Taketa et al. |
| 2003/0057590 | A1 | 3/2003 | Loher et al. |
| 2006/0125156 | A1 | 6/2006 | Woolhouse |
| 2007/0149080 | A1 | 6/2007 | Asahara et al. |
| 2008/0169380 | A1 | 7/2008 | Jackson et al. |
| 2009/0110901 | A1 | 4/2009 | Gaw et al. |
| 2011/0111172 | A1* | 5/2011 | Gideon et al. ............... 428/138 |
| 2013/0022391 | A1 | 1/2013 | Fisher, Jr. et al. |
| 2013/0047403 | A1 | 2/2013 | Gideon et al. |
| 2016/0096244 | A1 | 4/2016 | Blom |

FOREIGN PATENT DOCUMENTS

| | | |
|---|---|---|
| EP | 0376472 A2 | 7/1990 |
| EP | 0419403 A1 | 3/1991 |
| EP | 0916477 A1 | 5/1999 |
| GB | 2349600 A | 11/2000 |
| SU | 545785 A1 | 2/1977 |
| WO | 8909123 A1 | 10/1989 |
| WO | WO9619336 A1 | 6/1996 |
| WO | WO2008011404 A2 | 1/2008 |
| WO | 2008149615 A1 | 12/2008 |
| WO | 2009120920 A1 | 10/2009 |
| WO | 2011056293 A1 | 5/2011 |

OTHER PUBLICATIONS

Final Office Action, dated May 15, 2015, regarding U.S. Appl. No. 13/773,120, 12 pages.

Final Office Action, dated Aug. 8, 2013, regarding U.S. Appl. No. 12/613,842, 16 pages.

Final Office Action, dated Aug. 15, 2013, regarding U.S. Appl. No. 13/653,080, 13 pages.

Notice of Allowance, dated Dec. 9, 2013, regarding U.S. Appl. No. 12/613,842, 13 pages.

Notice of Allowance, dated Dec. 11, 2013, regarding U.S. Appl. No. 13/653,080, 15 pages.

Fisher, Jr., "Narrow Flake Composite Fiber Material Compression Molding," U.S. Appl. No. 13/356,132, filed Jan. 23, 2012, 23 pages.

"Compression Molding," Wikipedia, dated May 26, 2012, 4 pages, accessed May 30, 2012, http://en.wikipedia.org/wiki/Compression_molding.

"Fabrication Methods," Composites World, dated Nov. 1, 2007, 9 pages, accessed May 30, 2012, http://www.compositesworld.com/articles/fabrication-methods.

"HexMC Moulding Concept Carbon Epoxy HexMC/C/2000/M77 Product Data," Hexcel Corporation, Publication FTC112h, Oct. 2012, 2 pages.

"HexMC Moulding Concept Carbon Epoxy HexMC/C/2000/R1A Product Data," Hexcel Corporation, Publication FTC112f, Dec. 2008, 2 pages.

"HexTow Chopped Fiber Carbon Fiber Product Data," Hexcel Corporation, Sep. 2009, 2 pages.

Black "Redeisgning for Simplicity and Economy," High-Performance Composites, Jan. 2012, 4 pages, accessed Feb. 28, 2013, http://www.compositesworld.com/articles/redesigning-for-simplicity-and-economy.

Brosius, "Thermoplastic Composites Making an Impact," Composites World, dated Feb. 1, 2003, 6 pages, accessed May 30, 2012, http://www.compositesworld.com/articles/thermoplastic-composites-making-an-impact.

International Search Report and Written Opinion, dated Feb. 10, 2011, regarding Application No. PCT/US2010/048017 (WO2011056293), 10 pages.

Pan et al., "Analysis of 3D Random Chopped Fiber Reinforced Composites Using FEM and Random Absorption," ScienceDirect, Computational Materials Science, vol. 43, Issue 3, Sep. 2008, 27 pages.

Blom, "Hybrid Fastener and Method of Making the Same," U.S. Appl. No. 13/773,120, filed Feb. 21, 2013, 25 pages.

Office Action, dated Dec. 26, 2012, regarding U.S. Appl. No. 12/613,842, 17 pages.

Office Action, dated Apr. 9, 2013, regarding U.S. Appl. No. 12/613,842, 18 pages.

Office Action, dated Apr. 11, 2013, regarding U.S. Appl. No. 13/653,080, 32 pages.

International Search Report and Written Opinion, dated Apr. 28, 2014, regarding Application No. PCT/US2014/012013, 9 pages.

Notice of Allowance, dated Sep. 10, 2015, regarding U.S. Appl. No. 13/773,120, 6 pages.

International Preliminary Report on Patentability, dated Aug. 25, 2015, regarding Application No. PCT/US2014/012021, 6 pages.

Office Action, dated Jul. 8, 2015, regarding U.S. Appl. No. 14/182,287, 14 pages.

Notice of Allowance, dated Aug. 4, 2015, regarding U.S. Appl. No. 14/182,287, 10 pages.

* cited by examiner

METHOD FOR FABRICATING COMPOSITE FASTENERS

CROSS REFERENCE TO RELATED APPLICATIONS

This application is related to co-pending U.S. patent application Ser. No. 13/773,120, filed concurrently herewith on Feb. 21, 2013, which is incorporated by reference herein in its entirety.

BACKGROUND INFORMATION

1. Field

The present disclosure generally relates to fasteners, and deals more particularly with a method and apparatus for fabricating high strength composite fasteners.

2. Background

Plastic fasteners such as threaded bolts and screws have been developed for use in several applications because of their light weight, compared to metal fasteners. Plastic fasteners may be fabricated using injection molding, extrusion or compression molding techniques. It is known that plastic fasteners may be strengthened by incorporating reinforcement fibers in a plastic resin, however these reinforced plastic fasteners may nevertheless be weaker than metallic fasteners due to their relatively low fiber volume in relation to the plastic resin. In one approach, long, continuous axially aligned reinforcing fibers infused with a polymer resin are formed by a molding process. Although providing additional strength in the axial direction of the fastener, the fastener may be substantially anisotropic, rendering it unsuitable for some applications. Additionally, known reinforced plastic fasteners are difficult to fabricate, especially in high volume because of the need to layup and align continuous fibers in a mold.

Accordingly, there is a need for a method and apparatus for producing fiber reinforced, plastic fasteners that have a high fiber volume and exhibit quasi-isotropic properties. There is also a need for a method and apparatus of the type mentioned above which permits fabrication of high-strength plastic fasteners quickly and in high-volume Further, there is a need for threaded fasteners which incorporate fibers in the threads to increase thread strength.

SUMMARY

The disclosed embodiments provide a method and apparatus for fabricating fiber reinforced, high-strength thermoplastic fasteners which exhibit quasi-isotropic properties, and which may be manufactured rapidly and in high-volume using compression molding equipment. The fasteners have a high fiber volume in relation to the thermoplastic resin volume and can be molded to near net shape, in any of a variety of geometries. Light weight, high-strength fasteners may be produced which are suitable for use in high-performance applications such as airframes for aircraft.

According to one disclosed embodiment a method is provided of producing a composite fastener. The method comprises introducing thermoplastic resin infused fiber flakes into a reservoir, heating the infused fiber flakes in the reservoir to the melting temperature of the thermoplastic resin, resulting in a mixture of melted thermoplastic resin and fiber flakes, and flowing the mixture of the melted thermoplastic resin and fiber flakes into a mold having the shape of the fastener. The method may further comprise providing a fiber pre-preg having a relatively high fiber content, and chopping the fiber pre-preg into the infused flakes. The fiber pre-preg may include bidirectional reinforcing fibers. The method also comprises measuring a charge of the infused fiber flakes to be introduced into the reservoir, wherein the charge corresponds to a volume when melted that substantially matches the volume of a plurality of mold cavities in the mold. The method may further comprise compressing melted thermoplastic resin and the infused fiber flakes in the mold. Flowing the mixture into the mold includes randomly orienting the fiber flakes in the mixture.

According to another disclosed embodiment, a method is provided of producing fiber reinforced thermoplastic fasteners, comprising producing thermoplastic resin infused fiber flakes, and placing a charge of the infused fiber flakes into a reservoir. The method also includes heating the infused fiber flakes within the reservoir until resin in the infused fiber flakes melt and become a flowable mixture of thermoplastic resin and fibers, flowing the flowable mixture from the reservoir into each of a plurality of mold cavities in a mold, each of the mold cavities having the shape of a fastener, and compression molding the flowable mixture into a plurality of fasteners. Producing the infused fiber flakes is performed by cutting fiber pre-preg, which may be accomplished by chopping strips of unidirectional pre-preg tape. The method may further comprise forming a charge of the infused fiber flakes having a volume, when melted, that substantially corresponds to the volume of the mold cavities. Flowing the flowable mixture into the mold cavities is performed such that fiber orientations of the fiber flakes are random substantially throughout each of the mold cavities. The method may also comprise allowing the fasteners to cool and solidify within the mold cavities, and removing the fasteners from the mold cavities.

According to still another disclosed embodiment, apparatus is provided for producing a plurality of composite fasteners, comprising a mold having a plurality of mold cavities respectively defining fasteners, and a reservoir for containing thermoplastic infused fiber flakes, the reservoir being coupled with the mold cavities and adapted to be heated to melt the thermoplastic infused fiber flakes. The reservoir is integrated with the mold, and the mold optionally includes a wall separating the reservoir from the mold cavities, and a flow control opening in the wall for controlling the flow of melted, infused fiber flakes from the reservoir into the mold. The apparatus may further comprise heater elements for heating the mold and the reservoir. The reservoir has a substantially open top, and the apparatus further comprises a male die adapted to be displaced into the reservoir and force melted fiber flakes to flow from the reservoir into the mold cavities. The mold includes a wall separating the reservoir from the mold cavities, and the wall includes an opening therein through which the melted fiber flakes may flow from the reservoir into the mold cavities. The wall is spaced from the mold cavities to form a flow region through which the melted fiber flakes may be distributed to the mold cavities. In one variation, the reservoir is located above and is directly open to the mold cavities.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
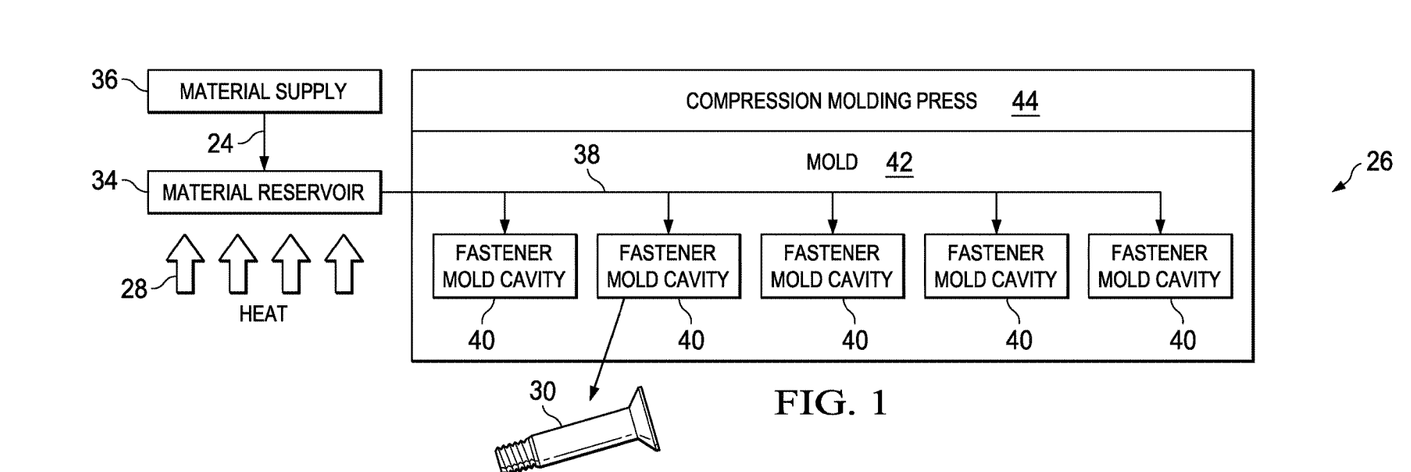
FIG. 1 is an illustration of a functional block diagram of apparatus for producing high-strength composite fasteners according to one disclosed embodiment.
Figure 2:
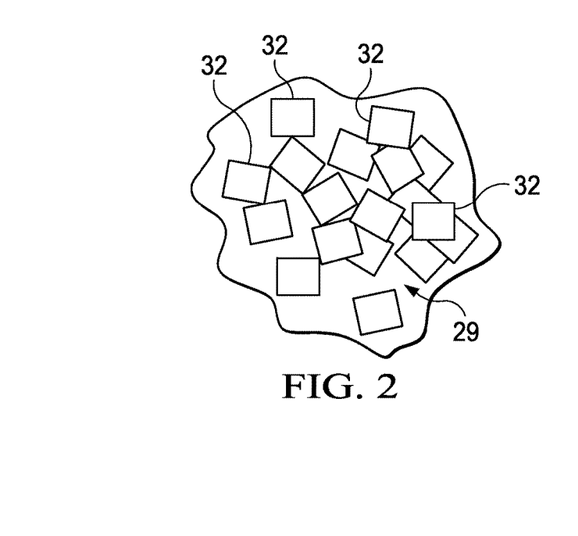
FIG. 2 is an illustration of a mixture of fiber flakes thermoplastic resin used to fill mold cavities forming part of the apparatus shown in FIG. 1.
Figure 4A:
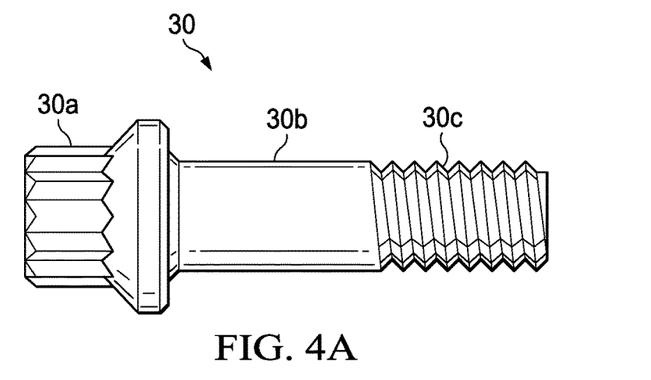
FIG. 4A is an illustration of a longitudinal side view of one form of the high-strength composite fastener.
Figure 4B:
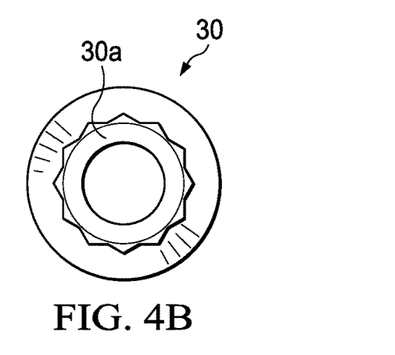
FIG. 4B is an illustration of end view of the fastener shown in FIG. 4A.
Figure 5A:
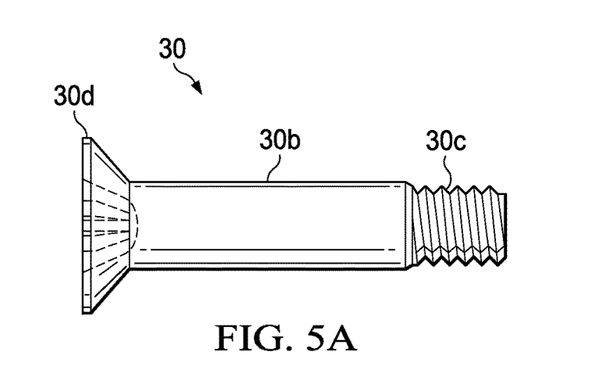
FIG. 5A is an illustration of a longitudinal side view of another form of the high strength composite fastener.
Figure 5B:
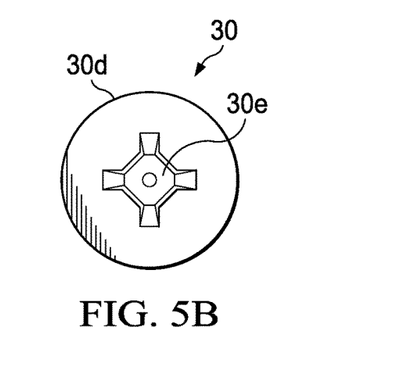
FIG. 5B is an illustration of an end view of the fastener shown in FIG. 5A.
Figure 6A:
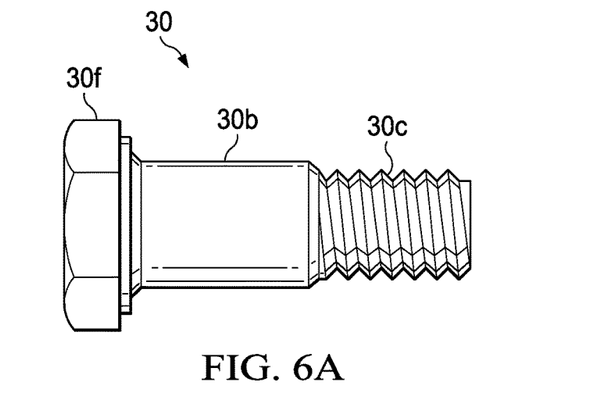
FIG. 6A is an illustration of a longitudinal side view of a another form of the high-strength composite fastener.
Figure 6B:
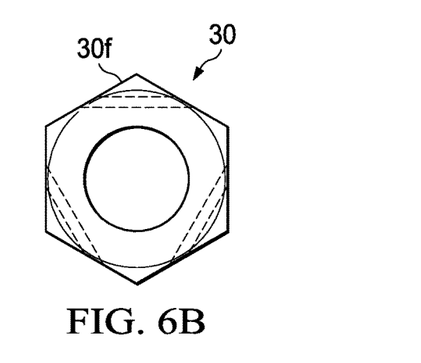
FIG. 6B is an illustration of an end view of the fastener shown in FIG. 6A.

Referring first to FIGS. 1 and 2, the disclosed embodiments relate to a method and apparatus for producing high-strength composite fasteners 30 having a high fiber volume and exhibiting quasi-isotropic properties. Fasteners 30 may be produced which have any of a variety of sizes, geometries and features. For example, as shown in FIGS. 4A and 4B, the fastener 30 may have a 12 point wrenching head 30a, a shank 30b and a threaded tip 30c. Another example of the fastener 30, shown in FIGS. 5A and 5B, is provided with a countersunk head 30b having a screwdriver recess 30e. Still another example of the fastener 30, shown in FIGS. 6A and 6B, is provided with a hex head 30f. The fasteners 30 shown in FIGS. 4A-6B, should not be interpreted as limiting, but rather are merely exemplary of a wide variety of fastener geometries and features that may be manufactured using the disclosed method and apparatus. The particular fastener design that is selected will depend on the application, and specific fastener performance requirements.

Referring again to FIGS. 1 and 2, the fasteners 30 are compression molded in a compression molding machine 44, although other molding equipment and techniques may be possible. A preselected charge 24 of randomly oriented, thermoplastic infused fiber flakes 32 is loaded into a material reservoir 34 from a material supply 36. The infused fiber flakes 32 are heated 28 within the material reservoir 34 until the resin in the infused fiber flakes 32 melts and becomes flowable, resulting in a flowable mixture 29 of melted resin and fiber flakes 32. The flowable mixture 29 of melted resin and fiber flakes 32 is directed through channels 38 or other flow areas within a partable mold 42, into a plurality of individual fastener mold cavities 40 in the mold 42. Each of the mold cavities 40 has a geometry defining a fastener 30. As will be discussed below in more detail, the material reservoir 34 may be integrated into the mold 42.

Figure 3:
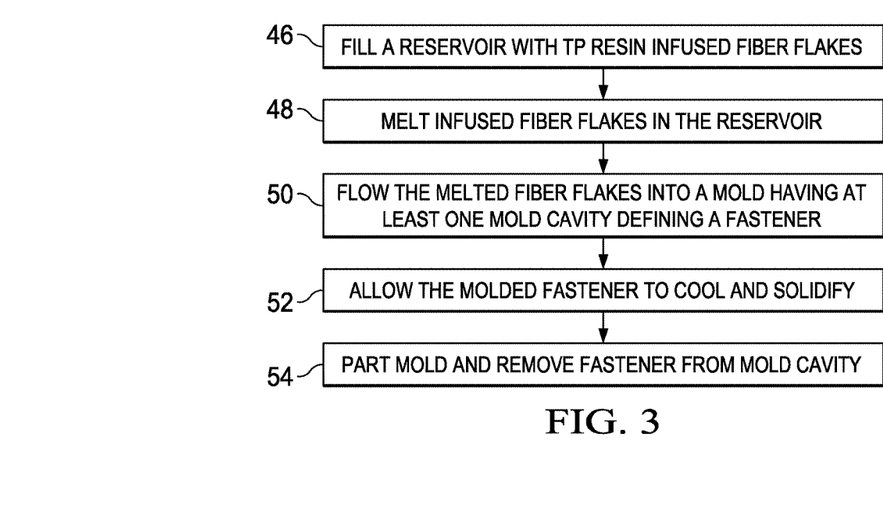
FIG. 3 is an illustration of a flow diagram of a method of making the high-strength composite fasteners using the apparatus of FIG. 1.

FIG. 3 illustrates the overall steps of a method of producing high-strength composite fasteners using the apparatus shown in FIG. 1. At step 46, a reservoir 34 is filled with a charge 24 of thermoplastic resin infused fiber flakes 32. The charge 24 may be premeasured to correspond to a volume, which, when melted, substantially matches the volume of the mold cavities. At 48, the infused fiber flakes 32 are melted by heating 28 the charge 24 within the reservoir 34. At step 50, the melted fiber flakes 32 are flowed into a mold 42 having at least one mold cavity 40 defining a fastener 30. Although not shown in FIG. 3, optionally, a quantity of resin may be added or removed from the melted charge 24 before the charge 24 is flowed into the mold cavity 40 in order to adjust the fiber fraction of the finished fastener 30. At 52, the molded fastener 30 is allowed to cool and solidify, and at step 54, the mold 42 is parted and the fastener 30 is removed from the mold cavity 40.

In one embodiment, the mold charge 24 may comprise fiber flakes 32 that are formed from unidirectional fibers pre-impregnated with a thermoplastic resin. Fasteners 30 produced by the disclosed method may achieve a high fiber content by employing pre-preg fiber in which the fiber content is relatively high, for example, and without limitation, at least approximately 60% fiber content or higher. In this embodiment, the source of the thermoplastic resin which forms that fastener 30 is derived solely from the resin contained in the infused fiber flakes 32. Alternatively, however, it may be possible to use tackified dry fiber flakes 32 that may not be pre-impregnated with resin, in which case a premeasured quantity of thermoplastic resin may added to the mold charge 24. It should be noted here that in some embodiments, satisfactory performance results may be obtained where the fiber content of the fastener 30 is substantially less than 60%.

The fiber flakes 32 may have one or more specific shapes which may aid in maintaining a substantially uniform distribution and random orientation of the reinforcing fibers 33 (see FIGS. 3 and 4) within the melted mixture 29 of resin and fiber flakes 32 as the mixture 29 flows into the mold cavities 40. The specific shapes of the fiber flakes 32 may also assist in imparting quasi-isotropic mechanical properties to the fastener 30 by incorporating various lengths of fiber reinforcement within the mixture 29. The thermoplastic resin may comprise a relatively high viscosity thermoplastic resin such as, without limitation, PEI (polyetherimide) PPS (polyphenylene sulphide), PES (polyethersulfone), PEEK (polyetheretherketone), PEKK (polyetheretherketone), and PEKK-FC (polyetherketoneketone-fc grade), to name only a few. The reinforcing fibers 33 (FIG. 7) in the fiber flakes 32 may be any of a variety of high strength fibers, such as, without limitation, carbon, metal, ceramic and/or glass fibers. It may also be possible to reinforce the fastener 30 by adding metallic and/or ceramic particles or "whiskers" to the mold charge 24.

The fiber flakes 32 may be formed, for example and without limitation, using a rotary chopper to chop fiber pre-preg tape, or by die cutting individual shapes from a roll or strip of pre-preg tape (not shown) having a high fiber content or from a sheet of pre-preg having a high fiber content. Alternatively, as previously mentioned, it may be possible to form the fiber flakes 32 from a tackified dry fiber perform (not shown), as by die cutting or other techniques. It may also be possible to form the fiber flakes 32 using other production processes.

Figure 7:
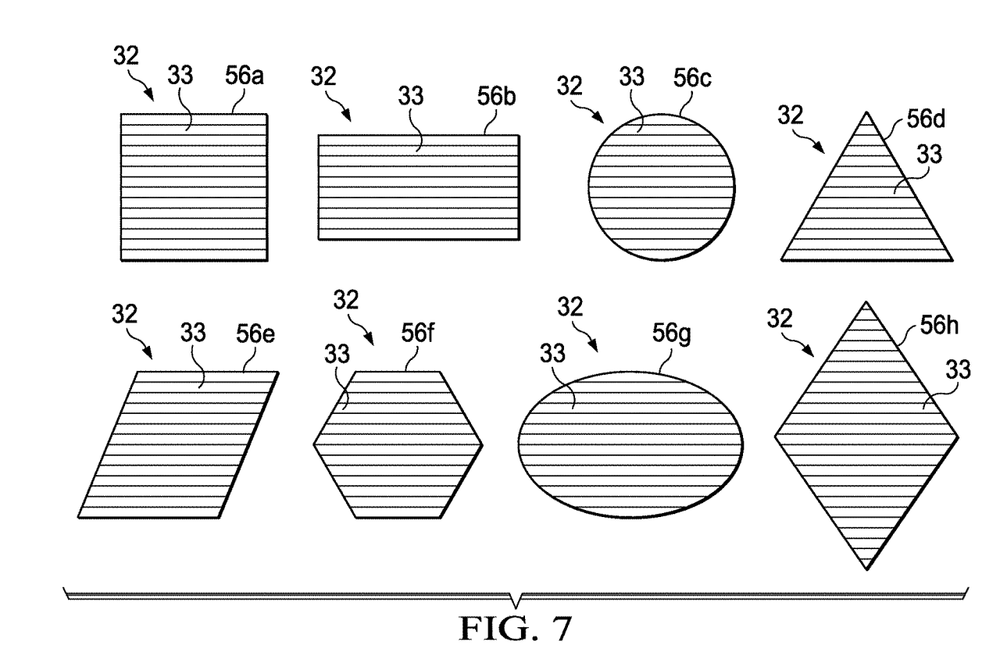
FIG. 7 is an illustration of exemplary shapes of the thermoplastic fiber flakes used to mold the composite fasteners.

The fiber flakes 32 may be substantially flat and may have any of various outline shapes. For example, as shown in FIG. 7, the fiber flakes 32 may have the shape of a square 56a, a rectangle 56b, a circle 56c, an equilateral triangle 56d, a trapezoid 56e, a hexagon 56f or other polygon (not shown), an ellipse 56g or a diamond 56h. Other shapes are possible. In some embodiments, fiber flakes 32 with two or more of the shapes 56a-56h may be mixed together.

Figure 8:
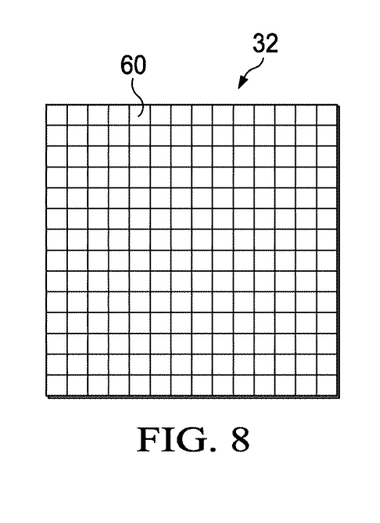
FIG. 8 is an illustration of a thermoplastic fiber flake having bidirectional reinforcing fibers.

The presence of fibers 33 having differing lengths in the mixture 29 may aid in achieving a more uniform distribution of the fiber flakes 32 in the fastener 30, while promoting isotropic mechanical properties and/or strengthening the fastener 30. Fiber flakes 32 having shapes such the circle 56c, triangle 56d, hexagon 56f, ellipse 56g and diamond 56h, may be particularly useful in improving the isotropic mechanical properties of the fastener 30 because of the fact that these shapes result in each fiber flake 32 having differing fiber lengths. Accordingly, a combination or mix of long and short fiber lengths within a single fiber flake 32 may be particularly desirable. Generally, the size and shape of the fiber flakes 32 may be selected to optimize the flow, strength and finish quality of the fastener 30. While the fiber flakes 32 illustrated in FIG. 7 employ unidirectional reinforcing fibers 33, the fiber flakes 32 may comprise resin infused bidirectional fibers 60 as shown in FIG. 8. The bi-directional fibers 60 may be intertwined with each other by weaving, knitting or other techniques.

Figure 9:
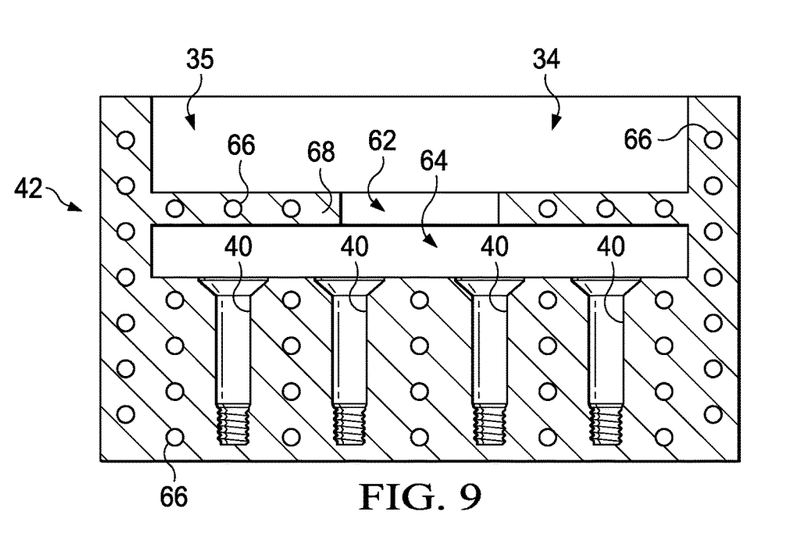
FIG. 9 is an illustration of a sectional view of a one embodiment of the mold forming part of the apparatus shown in FIG. 1.

Attention is now directed to FIG. 9 which illustrates additional details of one embodiment of the mold 42 previously discussed in connection with FIG. 1. In this example, the mold 42 includes an integrated reservoir 34 in the form of a recess 35 in the top of the mold 42. The top of the reservoir recess 35 is open to allow a charge of the infused fiber flakes (not shown in FIG. 9) to be placed in the reservoir 34. The reservoir 34 may be separated from a flow region 64 in the mold 42 by a separation wall 68 having a centrally located flow control opening 62 therein which allows a melted mixture 29 of resin and from the reservoir 34 to flow readily into the flow region 64. The mold 42 further includes a plurality of mold cavities 40 therein, beneath the flow region 64. As previously described, the size and geometry of each of the mold cavities 40 corresponds to, and defines one of the fasteners 30. In some embodiments, all of the mold cavities 40 may be substantially identical, whereas in other embodiments, the mold cavities 40 may be different from each other in order to produce fasteners 30 having differing sizes, shapes, and/or features. Moreover, some embodiments of the mold 42 may not employ the separation wall 68, in which case the reservoir 34 is above and is directly open to the mold cavities 40. In those embodiments employing the separation wall 68, a measured charge of the resin infused fiber flakes is placed in the reservoir 44 that substantially matches the volume of the mold cavities 40, plus the volume beneath the separation wall 68. In embodiments that do not employ the separation wall 68, a measured charge of the resin infused fiber flakes is placed in the reservoir 44 that substantially matches the volume of the mold cavities 40.

The mold 42 may also include integrated heating elements 66 both in the area of the reservoir 34 and the mold 42. The heating elements 66 function to both heat the infused fiber flakes 32 within the reservoir 34 to their melting temperature, and to maintain the elevated temperature of the resin as it flows into the mold cavities 40. In some embodiments, the mold 42 may not employ heating elements 66, in which case the mold 42 may be heated by placing it in an oven (not shown) where it is heated it to the required temperatures, following which it may be transferred to a hydraulic compression press where the molding operation is carried out. In either case, it may be useful in some applications to preheat the mold 42 in an oven prior to carrying out molding operations.

Figure 10:
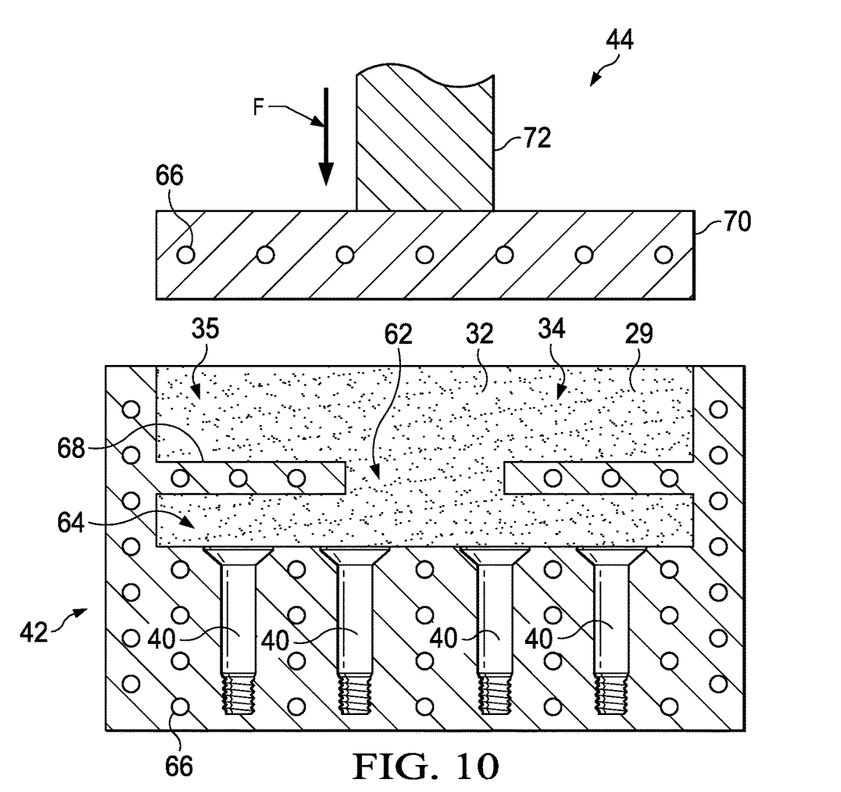
FIG. 10 is an illustration similar to FIG. 9, but showing the mold having been placed in a compression molding machine and filled with a charge of thermoplastic resin fiber flakes.
Figure 11:
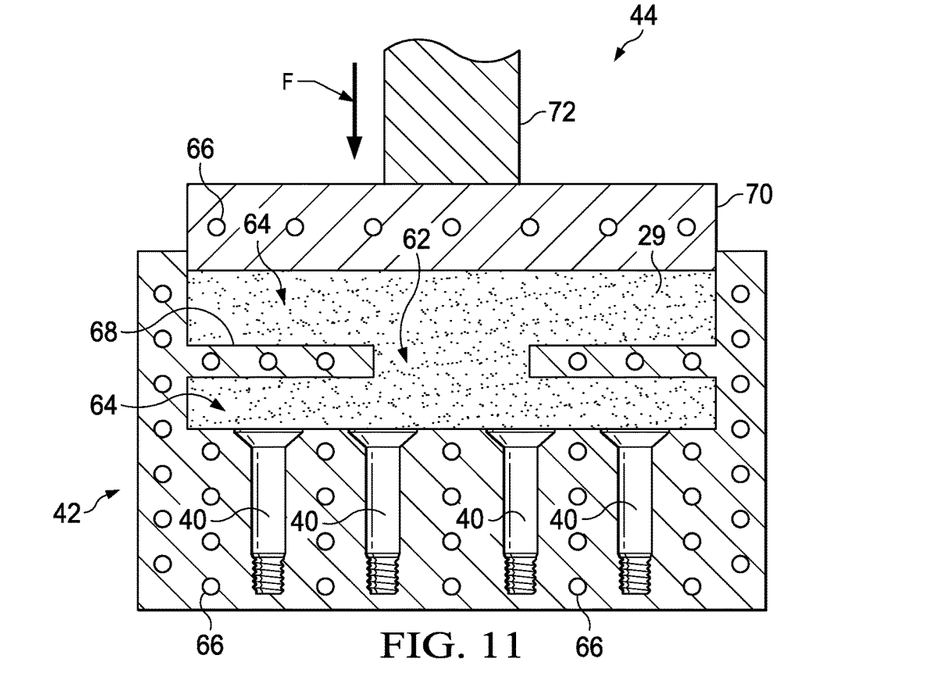
FIG. 11 is an illustration similar to FIG. 10, but showing a male die beginning to compress a heated charge in the mold.
Figure 12:
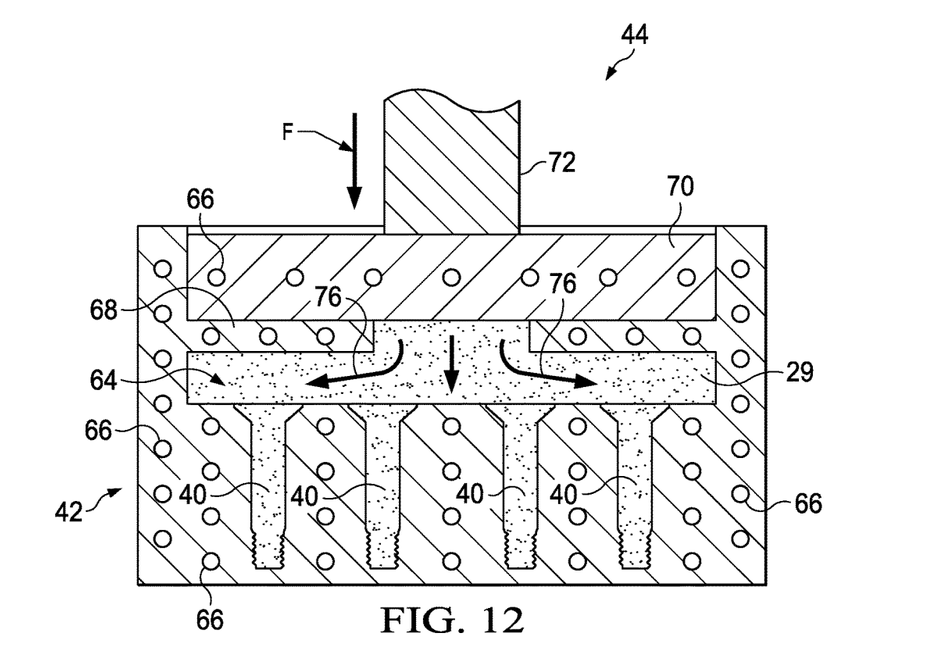
FIG. 12 is an illustration similar to FIG. 11, but showing the male die having compressed the heated charge and force it to flow into the mold cavities.

Referring now to FIG. 10, the mold 42 is placed in a compression molding machine 44 that includes a heated male die 70 coupled with a power operated ram 72. The male die 70 is axially aligned with and is forced into the reservoir recess 35 by force F generated by the ram 72 during a molding operation. FIGS. 11 and 12 illustrate sequential progress of the male die 70 as it is forced into the reservoir recess 35. As shown in FIG. 11, the male die 70 may be partially displaced to initially compact the charge 24, as the charge 24 is being heated to the melt temperature of the resin. Heating elements 66 integrated into the male die 70 may assist in accelerating heating of the charge 24 to the melt temperature of the resin. In other embodiments, the charge 24 may be heated to its melt temperature before the male die 70 is forced into the reservoir recess 35. Melting of the infused fiber flakes 32 while in the reservoir 34 assists in randomizing the fiber orientations of the fiber flakes 32, before they are flowed into the mold cavities 40.

Referring particularly to FIG. 12, when the resin in the infused fiber flakes 32 melts, the mixture 29 of the resin and the fiber flakes 32 becomes flowable. Continued displacement of the male die 70 further into the reservoir recess 35 compresses and causes the mixture 29 to flow 76 through the flow control opening 62 into the flow region 64. Continued pressure applied by the male die 70 results in the mixture 29 flowing into the mold cavities 40, thereby compressing and molding the fasteners 32 to near net shape. The random fiber orientations of the fiber flakes 32 flowing into the mold cavities 40 results in the molded fasteners 30 exhibiting substantially quasi-isotropic properties. Moreover, the relatively high fiber content of the fasteners 30 achieved by use of high fiber content pre-preg results in fasteners 30 that are high in strength. Following molding as described above, the mold 42 is allowed to cool, following which the mold 42 may be parted and the fasteners 30 may be removed. Depending upon the application, it may be necessary or desirable to perform post mold machining or other finish work on the fasteners 30.

Figure 13:
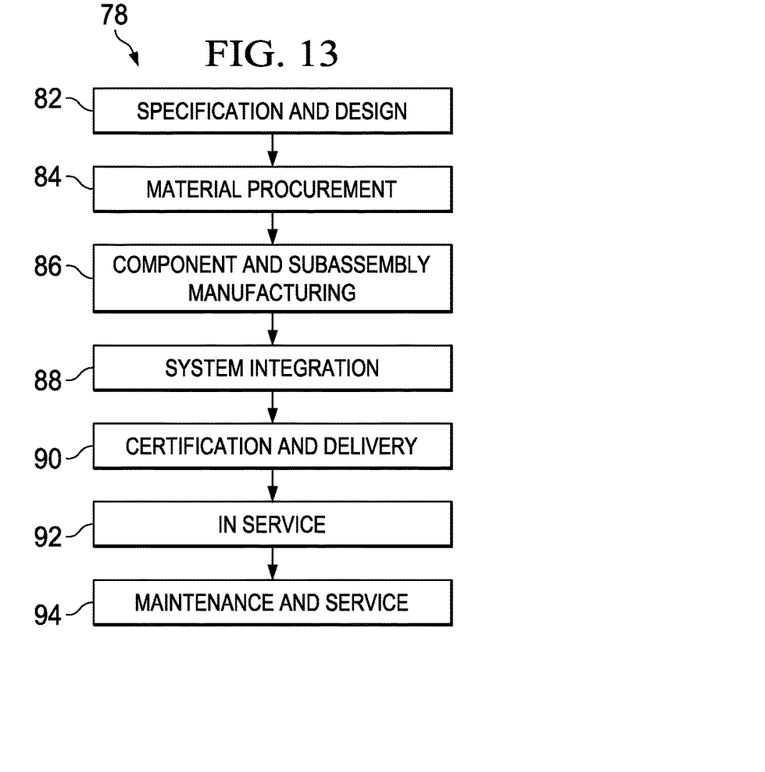
FIG. 13 is an illustration of a flow diagram of aircraft production and service methodology.

Embodiments of the disclosure may find use in a variety of potential applications, particularly in the transportation industry, including for example, aerospace, marine, automotive applications and other applications where high strength, lightweight fasteners are used. Thus, referring now to FIGS. 13 and 14, embodiments of the disclosure may be used in the context of an aircraft manufacturing and service method 78 as shown in FIG. 13 and an aircraft 80 as shown in FIG. 14.

Aircraft applications of the disclosed embodiments may include, for example, without limitation, fasteners that are used in the airframe 96 or in the interior 100 (FIG. 14) of the aircraft 80, to name only a few. During pre-production, exemplary method 78 may include specification and design 82 of the aircraft 80 and material procurement 84. During production, component and subassembly manufacturing 86 and system integration 88 of the aircraft 80 takes place. Thereafter, the aircraft 80 may go through certification and delivery 90 in order to be placed in service 92. While in service by a customer, the aircraft 80 is scheduled for routine maintenance and service 94, which may also include modification, reconfiguration, refurbishment, and so on.

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

Figure 14:
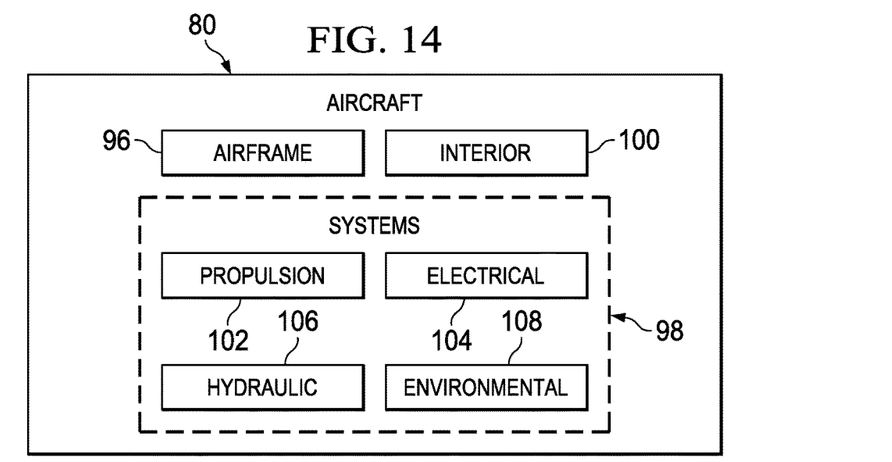
FIG. 14 is illustration of a block diagram of an aircraft.

As shown in FIG. 14, the aircraft 80 produced by exemplary method 78 may include an airframe 96 with a plurality of systems 98 and an interior 100. Examples of high-level systems 98 include one or more of a propulsion system 102, an electrical system 104, a hydraulic system 106, and an environmental system 108. Any number of other systems may be included. Although an aerospace example is shown, the principles of the disclosure may be applied to other industries, such as the marine and automotive industries.

Systems and methods embodied herein may be employed during any one or more of the stages of the production and service method 78. For example, components or subassemblies corresponding to production process 86 may be fabricated or manufactured in a manner similar to components or subassemblies produced while the aircraft 80 is in service. Also, one or more apparatus embodiments, method embodiments, or a combination thereof may be utilized during the production stages 86 and 88, for example, by substantially expediting assembly of or reducing the cost of an aircraft 80. Similarly, one or more of apparatus embodiments, method embodiments, or a combination thereof may be utilized while the aircraft 80 is in service, for example and without limitation, to maintenance and service 94.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of producing a composite fastener, comprising:
  introducing thermoplastic resin infused fiber flakes into a reservoir;
  heating the infused fiber flakes in the reservoir to the melting temperature of the thermoplastic resin, resulting in a mixture of melted thermoplastic resin and fiber flakes; and,
  flowing the mixture of the melted thermoplastic resin and fiber flakes into a mold having the shape of the fastener.

2. The method of claim 1, further comprising;
  providing a fiber pre-preg having a relatively high fiber content, and
  chopping the fiber pre-preg into the infused fiber flakes.

3. The method of claim 2, wherein the fiber pre-preg includes unidirectional reinforcing fibers forming at least approximately 60% by volume of the pre-preg.

4. The method of claim 2, wherein the fiber pre-preg includes bidirectional reinforcing fibers.

5. The method of claim 1, further comprising:
  measuring a charge of the infused fiber flakes to be introduced into the reservoir, wherein the charge corresponds to a volume when melted that substantially matches the volume of a plurality of mold cavities in the mold.

6. The method of claim 1, further comprising:
  compressing melted thermoplastic resin and the infused fiber flakes in the mold.

7. The method of claim 1, wherein flowing the mixture into the mold includes randomly orienting the fiber flakes in the mixture.

8. A method of producing fiber reinforced thermoplastic fasteners, comprising:
  producing thermoplastic resin infused fiber flakes;
  placing a charge of the infused fiber flakes into a reservoir;
  heating the infused fiber flakes within the reservoir until resin in the infused fiber flakes melt and become a flowable mixture of thermoplastic resin and fibers;
  flowing the flowable mixture from the reservoir into each of a plurality of mold cavities in a mold, each of the mold cavities having the shape of a fastener; and,
  compression molding the flowable mixture into a plurality of fasteners.

9. The method of claim 8, wherein producing the infused fiber flakes is performed by cutting fiber pre-preg.

10. The method of claim 9, wherein cutting the fiber pre-preg is performed by chopping strips of unidirectional pre-preg tape.

11. The method of claim 8, further comprising:
  forming a charge of the infused fiber flakes having a volume, when melted, that substantially corresponds to the volume of the mold cavities.

12. The method of claim 8, wherein flowing the flowable mixture into the mold cavities is performed such that fiber orientations of the fiber flakes are random substantially throughout each of the mold cavities.

13. The method of claim 8, further comprising:
  allowing the fasteners to cool and solidify within the mold cavities; and, removing the fasteners from the mold cavities.

* * * * *